Figure 1:
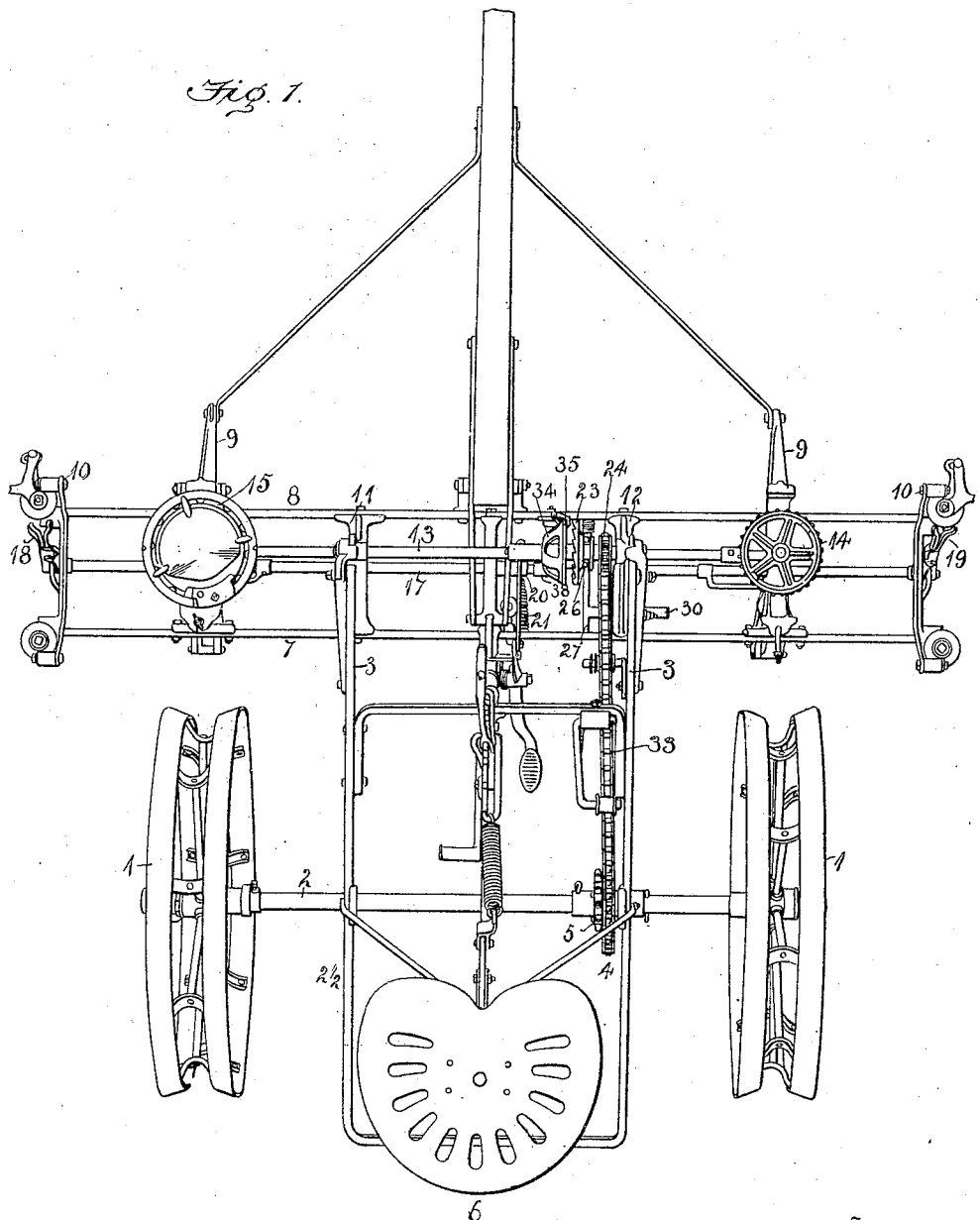

No. 880,841. PATENTED MAR. 3, 1908.
L. E. WATERMAN.
CORN PLANTER.
APPLICATION FILED OCT. 22, 1906.

2 SHEETS—SHEET 1.

Witnesses
Edwin L. Bradford
J. S. Clark

Inventor
L. E. Waterman.
By A. O. Behel
Attorney

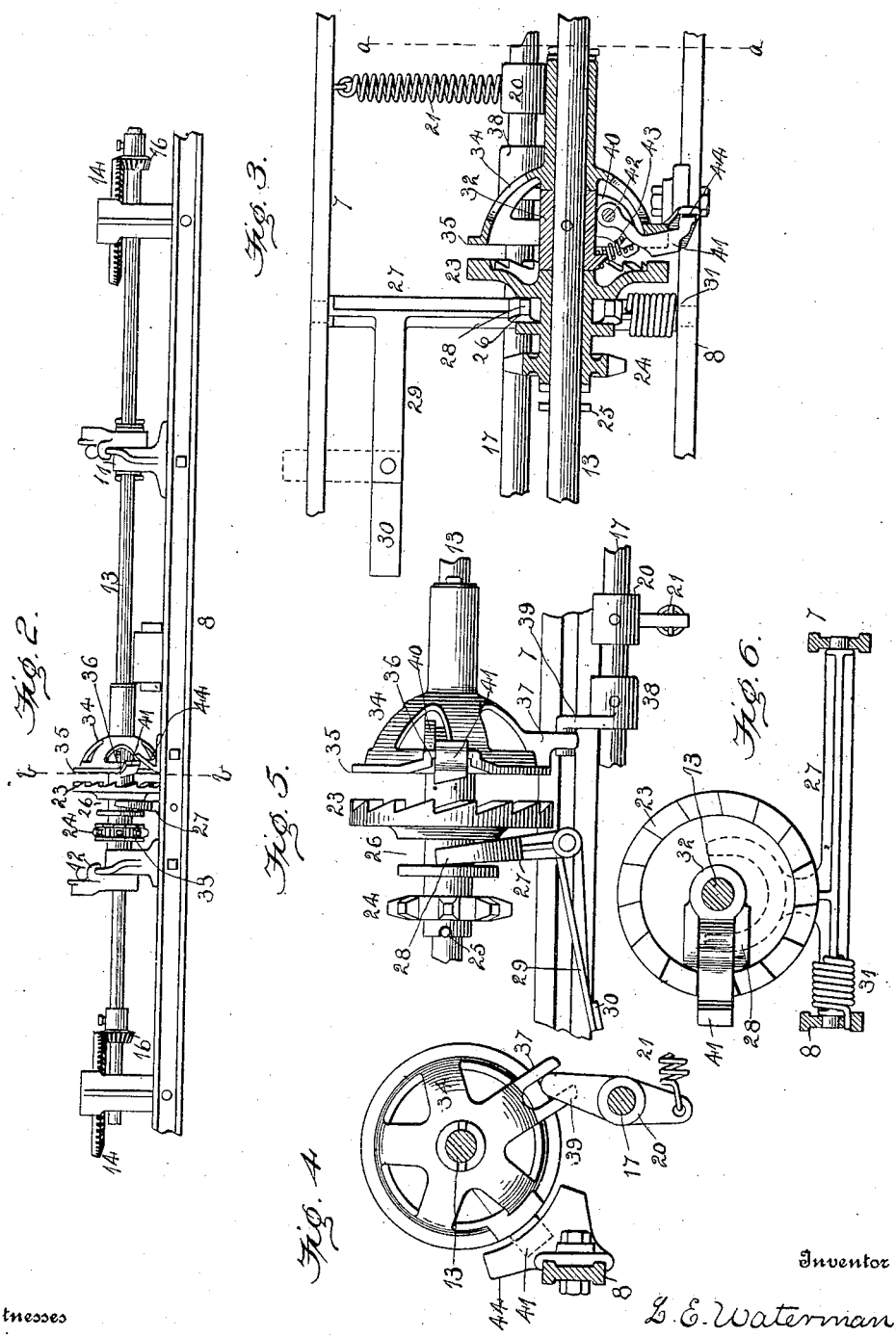

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

CORN-PLANTER.

No. 880,841.

Specification of Letters Patent.

Patented March 3, 1908.

Application filed October 22, 1906. Serial No. 339,976.

*To all whom it may concern:*

Be it known that I, LEWIS E. WATERMAN, a citizen of the United States, residing at Rockford, in the county of Winnebago and State of Illinois, have invented certain new and useful Improvements in Corn-Planters, of which the following is a specification.

The object of this invention is to impart a partial movement to the seed dropping mechanism by one means and to complete the movement by another means.

The further object of this invention is to start the rotation of the seed dropping mechanism by the action of the tappet wire and to complete the rotative movement by the supporting wheels of the planter.

In the accompanying drawings. Figure 1 is a plan view of a corn planter containing my improvements. Fig. 2 is a front elevation of a part of the runner frame of the planter with which my improvements have a connection. Fig. 3 is a horizontal section through the clutch mechanism. Fig. 4 is a transverse section on dotted line $a\ a$ Fig. 3. Fig. 5 is a front elevation of the clutch mechanism in which the front bar of the runner frame is removed. Fig. 6 is a transverse section on dotted line $b\ b$ Fig. 2.

The planter in the main, comprises the wheel frame composed of the supporting wheels 1, axle 2, main frame 2½ supported by the axle and having forwardly extending sections 3. The wheels are rotatively connected with the axle. The axle has two sprocket wheels 4 and 5 fixedly connected with it. The driver's seat 6 is supported by the wheel frame.

The runner frame is composed of the two bars 7 and 8 connected and supported by the runner or furrow openers 9. The bars 7 and 8 support the wire guides 10, one at each end. Brackets 11 and 12 are connected with the bars 7 and 8 and support a revolving shaft 13. The forward ends of the extensions 3 are pivotally connected with the brackets 11 and 12 around the revolving shaft 13 as a center.

The seed boxes are not shown, in order that the connection with the seed dropping mechanism may be more clearly seen. The bevel-gears 14 are supported in the bottom of the seed boxes and with which the seed plates 15 are connected to rotate therewith. The shaft 13 has two bevel pinions 16 fixedly connected to it, each of the bevel pinions 16 meshes with one of the bevel gears 14 as shown at Fig. 2.

An oscillating shaft 17 is supported by the runner frame in bearings formed in the brackets 11 and 12. To the ends of the shaft 17 are fixedly connected the tappet levers 18 and 19. A collar 20 has a fixed connection with the oscillating shaft 17, and a spring 21 has one end connected with the collar 20, and its other end connected with the bar 7. On the revolving shaft 13 is located a combined saw-toothed clutch face 23 and sprocket wheel 24, a pin 25 projects from the revolving shaft 13 and with which the combined clutch face and sprocket wheel may be moved into engagement.

An annular groove 26 is formed between the clutch face 23 and sprocket wheel 24. A shipping lever 27 is pivotally supported by the bars 7 and 8, its forked end 28 is located in the annular groove 26. From this shipping lever 27 extends an arm 29 having a pivoted extension 30. The clutch face and sprocket-wheel can be moved along the revolving shaft 13 until it engages the pin in the shaft, thereby forming a direct connection between the clutch face and sprocket-wheel and the revolving shaft 13, and can be held in this position by turning the extension 30 of the shipping lever under the bar 7 of the runner frame. A spring 31 has one end connected to the shipping lever and its other end is connected to the bar 8 of the runner frame. This spring acting through the shipping lever holds the clutch face and sprocket-wheel against a collar 32 which is pinned to the revolving shaft 13. A chain 33 connects the sprocket-wheels 4 and 24 which impart the rotary movement of the axle to the sprocket-wheel 24 and clutch face 23. On the revolving shaft 13 is loosely mounted a bell 34 having its surface 35 located at right angles to the length of the shaft 13. This surface 35 has a notch 36. This bell 34 has a slotted projection 37, and a collar 38 pinned to the rock shaft 17 has a finger 39 which is located in the slot of the projection 37. The collar 32 has ears 40 between which is located a dog 41 and is connected by a pin 42 passing through the ears and dog, a spring 43 holds the dog yieldingly within the notch 36. To the bar 8 of the runner frame is fixedly secured a cam surface 44.

When the parts are in the position shown at Figs. 1, 2 and 3, the clutch face 23 is constantly rotated by the chain connection with the axle, and the axle having a driving connection with the supporting wheels.

When one of the tappet levers engages a button on the tappet wire it will be moved rearward which will rock the rock shaft 17, and the finger 39 located in the slot of the projection 37 of the bell 34 will turn the bell on the revolving shaft 13. The turning movement of the bell will carry the dog 41 with it, as the dog is located in the notch 36. While the bell is moving the dog 41 a connection is formed between the revolving and rock shafts 13 and 17, and the tappet lever will impart a movement to the seed plates 15 through the bevel pinions 16 and bevel gears 14. The movement of the bell will carry the dog 41 against the cam-surface 44 which will move the dog into engagement with a tooth of the clutch face 23, and as the clutch face is constantly rotating in the same direction as the bell, the clutch face will continue the movement of the revolving shaft 13 and through it, the seed plates will be further rotated. Upon the dog being transferred from the bell to the clutch face, the spring 21 will return the tappet levers to their normal or starting positions, and said movement will cause the bell to be returned to its starting position.

The space between the clutch face 23 and the surface 35 of the bell is just sufficient to permit the dog 41 to move with the clutch face, and when the dog reaches the notch 36 in the bell, the spring 43 will transfer the dog from the clutch face to the bell which will stop the rotation of the revolving shaft 13 and consequently stop the rotation of the seed plates after they have made so much of a revolution necessary to drop the required number of kernels of corn. By this arrangement, the seed plates may be turned by the action of tappet levers against the tappets on a tappet wire until the dog is transferred into engagement with the clutch face which is rotated by the supporting wheels.

One complete revolution is given the revolving shaft 13 which carries the dog with it. By this arrangement there is no sudden starting of the seed plates, as the action of the tappet levers against the tappets on the tappet wire is gradual and without jar, and after the seed plates have been placed in motion, the motion is continued by the supporting wheels.

In drilling corn, the clutch face is moved into the position shown at Fig. 3 which will form a driving connection between the clutch face and the revolving shaft 13, and through the shaft to the seed plates. After this engagement has been made the supporting wheels will continue to rotate the seed plates.

In transferring the dog from the bell to the clutch face, should the dog strike the top of a tooth of the clutch face, the spring will permit the clutch face to yield until the dog is in proper engagement with the clutch face.

I claim as my invention.

1. In a corn planter, seed dropping mechanism, a revolving shaft for imparting movement to the seed dropping mechanism, a clutch face loosely mounted on the shaft and having driving connection with the supporting wheels, a dog movable with the shaft, a stationary cam, and means operated by the tappet lever for carrying the dog against the cam and into engagement with the clutch face, and means for restoring the carrying means to its starting position.

2. In a corn planter, seed dropping mechanism, a revolving shaft for imparting movement to the seed dropping mechanism, a clutch face loosely mounted on the shaft and having a driving connection with the supporting wheels, a dog movable with the shaft, a stationary cam, and means operated by the tappet wire for carrying the dog against the cam and into engagement with the clutch face, means for restoring the carrying means to its starting position, the starting means receiving the dog after the completion of the movement of the seed dropping mechanism.

LEWIS E. WATERMAN.

Witnesses:
A. O. BEHEL,
E. BEHEL.